United States Patent Office 3,636,111
Patented Jan. 18, 1972

3,636,111
CARBAMOYL OXIMES
Marvin J. Karten, Ardsley, N.Y., assignor to
USV Pharmaceutical Corporation
No Drawing. Continuation-in-part of application Ser. No. 714,450, Mar. 20, 1968, which is a continuation-in-part of application Ser. No. 680,047, Nov. 2, 1967. This application Nov. 18, 1969, Ser. No. 877,822
Int. Cl. C07c 131/00
U.S. Cl. 260—566  14 Claims

ABSTRACT OF THE DISCLOSURE

Compounds of the formula $$R_1-\underset{\underset{O}{\overset{\|}{N}}-O-\underset{\|}{\overset{\|}{C}}-N}{\overset{C-Y-X}{\|}}\overset{R_2}{\underset{R_3}{<}}$$

wherein $R_1$ and $R_3$ are lower aliphatic, cycloalkyl, or aromatic (including hetero), $R_2$ is hydrogen, aromatic, lower aliphatic, or phenyl-lower alkyl, Y is an alkylene group having from 1–5 carbon atoms, and X is a secondary amino group, have potent analgesic activity, particularly when $R_3$ is a p-alkoxyphenyl (e.g. p-methoxyphenyl and p-ethoxyphenyl). Compounds wherein both $R_1$ and $R_3$ are phenyl exhibit anticonvulsant activity. Compounds where $R_1$ is phenyl or 4-chlorophenyl and $R_3$ is cycloalkyl, such as cyclohexyl, show topical anesthetic activity. A number of compounds also have hypotensive activity.

---

This application is a continuation-in-part application of my copending application Ser. No. 714,450, filed Mar. 20, 1968, now abandoned, which application is a continuation-in-part application of my copending application Ser. No. 680,047, filed Nov. 2, 1967, now abandoned.

This invention relates to new chemical compounds. More particularly, it relates to carbamoyl oximes. Still more particularly it relates to carbamoyl esters of oximes having the structure $$R_1-\underset{\underset{O}{\overset{\|}{N}}-O-\underset{\|}{\overset{\|}{C}}-N}{\overset{C-Y-X}{\|}}\overset{R_2}{\underset{R_3}{<}}$$

wherein $R_1$ and $R_3$ are lower alkyl, lower alkenyl, cycloalkyl, or aromatic groups, and may be the same or different, $R_2$ is hydrogen, phenyl, lower alkyl, lower alkenyl, phenyl-lower alkyl, Y is an alkylene group having from 1–5 carbon atoms, and X is di-(lower alkyl) amino, di-(lower alkenyl)-amino, di-(cycloalkyl)amino, N-lower alkyl-N-cycloalkylamino, N - lower alkenyl - N-lower alkylamino, pyrrolidino, piperidino, homopiperidino, morpholino, thiomorpholino, piperazino, or N - methylpiperazino, and their pharmaceutically acceptable non-toxic acid addition salts.

The invention also relates to methods of preparing said compounds.

Lower alkyl groups include straight chain or branched alkyl radicals having from 1–5 carbon atoms, such as methyl, ethyl, propyl, isopropyl, butyl, t-butyl, amyl, isoamyl and the like.

The lower alkenyl group has from 2–5 carbon atoms and includes vinyl, propenyl, allyl, isopropenyl, and the like.

Included within the scope of cycloalkyl groups are cycloalkyl groups per se having from 3–6 carbon atoms as well as lower alkyl substituted cycloalkyl and cycloalkyl-lower alkyl groups.

Lower alkoxy groups include straight chain or branched alkoxy radicals having from 1–5 carbon atoms, such as methoxy, ethoxy, propoxy, isopropoxy, butoxy, t-butoxy and the like.

The aromatic group in $R_1$ and $R_3$ includes such radicals as phenyl, α-naphthyl, β-naphthyl, phenyl-lower alkyl, and the like, which groups along with the $R_2$ phenyl group may be substituted with such radicals as lower alkyl, lower alkoxy, halogen, hydroxy, amino, di-alkylamino, thiol, nitro, hydroxy-lower alkyl, lower alkoxy-lower alkyl, dialkylamino-lower alkyl, dialkyl-amino-lower alkoxy, cyano, haloalkyl and carboxyl; and heterocyclic radicals such as pyridyl, pyridyl-lower alkyl, furyl, furfuryl, quinolyl, isoquinolyl, imidazolyl, benzimidazolyl, thienyl, and the like, which heterocyclic radicals may be similarly substituted.

Within the scope of X are included dimethylamino, methylethylamino, diethylamino, ethylbutylamino, methylpropylamino, dipropylamino, di-isopropylamino, di-butylamino, diallylamino, N-alkyl-N-ethylamino, dicyclohexylamino, N - cyclohexylmethyl-N-methylamino, and the like. The piperidino, morpholino, thiomorpholino, pyrrolidino, homopiperidino, and piperazino groups may carry such substituents as lower alkyl, lower alkoxy, hydroxy, hydroxy-lower alkyl, lower alkoxy-lower alkyl, and carbalkoxy.

The Y alkylene group may be a straight chain or branched, such as methylene, ethylene, propylene, 1-methyl-ethylene, 2-methyl-ethylene and the like.

It is known to chemists that the carbamoyl esters of oximes of this invention may exist in either one or both of two geometric configurations; one being syn and the other anti. Either or both structures are contemplated as within the scope of this invention.

Suitable pharmaceutically acceptable non-toxic and addition salts include the hydrochloride, hydrobromide, phosphate, sulfate, acetate, lactate, malate, succinate, maleate, malonate, citrate, benzoate, cinnamate, mandelate, nicotinate, salicylate, acetylsalicylate, and the like.

Compounds wherein $R_2$ is hydrogen are prepared in accordance with one process of this invention which comprises condensing at ambient temperature in an inert solvent an oxime having the structure $$R_1-\underset{\underset{N-OH}{\overset{\|}{N}}}{\overset{C-Y-X}{\|}}$$

with an isocyanate having the structure $$R_3-N=C=O$$

wherein $R_1$, $R_3$, Y and X are the same as above.

According to another method of the invention, the compounds wherein $R_2$ is lower alkyl are prepared by condensing at ambient temperature in an inert solvent an oxime having the structure $$R_1-\underset{\underset{N-OH}{\overset{\|}{N}}}{\overset{C-Y-X}{\|}}$$

with a carbamoyl chloride having the structure $$\underset{R_3}{\overset{R_2}{>}}N-\underset{\|}{\overset{O}{C}}-Cl$$

wherein $R_1$, $R_3$, Y and X are the same as above and $R_2$ is lower alkyl.

The acid addition salts are conveniently prepared by mixing equimolar amounts of the free base of the carbamoyl ester of the oxime with the desired acid in an inert solvent, such as ether.

The oximes are prepared according to the methods described in my copending application Ser. No. 680,015, filed Nov. 2, 1967, now abandoned.

The following examples illustrate the best mode contemplated by the inventor for carrying out the invention but are not to be construed as limiting the scope thereof.

EXAMPLE I

O - (N - ethyl-N-phenylcarbamoyl)-3-diethylaminopropiophenone oxime HCl

To a mixture of 11.02 g. of 3-diethylaminopropiophenone oxime and 9.08 g. of ethylphenylcarbamoyl chloride was added 50 ml. pyridine and the resulting solution was left standing at room temperature. The solution was treated with 50 ml. ether and then refrigerated for 4 hours to complete the crystallization process. The crystals were filtered, washed with ether and dried to give 12.5 g. of product, melting at 154–5°.

EXAMPLE II

O - cyclohexylcarbamoyl-3-dimethylamino-4'-chloropropiophenone oxime

To a solution of 7.04 g. of cyclohexylisocyanate in a liter of benzene was added 12.75 g. of 3-dimethylamino-4-chloropropiophenone oxime. The mixture was stirred for several hours. The resulting solution was evaporated to a syrup which crystallized. The solid was recrystallized from benzene and petroleum ether (30–60°) to give 9.3 g. of product, M.P. 88–90°.

EXAMPLE III

O - phenylcarbamoyl-3-diethylaminopropiophenone oxime maleate

To a solution of 5.75 g. of phenyl isocyanate in 75 ml. of benzene was added 10.6 g. of 3-diethylaminoprophenone oxime. The mixture was stirred at room temperature. The resulting solution was evaporated to a viscous residue (17.4 g.) which was dissolved in 75 ml. ether and treated with 6.25 g. of maleic acid in 350 ml. ether with stirring. After stirring for one hour, the oily material crystallized and was filtered, washed with ether and recrystallized from methanol and ether to give 11.5 g. of product, M.P. 107–8°.

EXAMPLE IV

O - (4-methoxyphenylcarbamoyl)-3-pyrrolidinopropiophenone oxime hydrochloride

To a solution of 26.0 g. (0.174 mole) of 4-methoxyphenylisocyanate in 700 ml. of benzene was added 38.0 g. (0.174 mole) of 3-pyrrolidinopropiophenone oxime. The mixture was stirred at room temperature. The solution was evaporated to a viscous residue which was dissolved in 75 ml. ethanol, treated with 40 ml. saturated ethanolic hydrogen chloride, followed by addition of 1 liter of ether. The white solid was filtered, washed with ether and dried to give 64 g. of crude product. The crude solid was recrystallized from warm methanol and ether and then from warm (45°) water to give 35 g. product, M.P. 156–159°.

EXAMPLE V

O - (4-methoxyphenyl-carbamoyl)-3-piperidinopropiophenone oxime hydrochloride

A mixture of 19.35 g. of 3-piperidinopropiophenone oxime and 12.46 g. of 4-methoxyphenylisocyanate in 200 ml. benzene was stirred for 2 hours. The solution was evaporated to give a residue which was dissolved in 40 ml. methanol, treated with 100 ml. methanolic hydrogen chloride (1.3 N) and 300 ml. ether. The resulting solid was filtered, washed with ether and dried to give 33 g. of crude product. Recrystallization of the solid from methanol and ether gave 28.0 g. of product, M.P. 180–4° (dec.).

EXAMPLE VI

O - (4 - methoxyphenylcarbamoyl)-3-diethylaminopropiophenone oxime hydrochloride To a solution of 19.1 g. of 4-methoxyphenylisocyanate in 400 ml. of benzene was added 28.3 g. of 3-diethylaminopropiophenone oxime. The mixture was stirred at room temperature. The solution was evaporated to a viscous residue, which was stirred for 2 hours with 100 ml. 3 N hydrochloric acid, the resulting white solid filtered, washed with 400 ml. ether and dried to give 52 g. of a white solid. The solid was recrystallized from methanol and ether to give 31 g. of product, M.P. 153–6° (dec.).

EXAMPLE VII

O - [N-ethyl-N-(4-methoxyphenyl)-carbamoyl]-3-diethylaminopropiophenone oxime hydrochloride To a mixture of 37.8 g. of 3-diethylaminopropiophenone oxime and 35.7 g. of ethyl-4-methoxyphenylcarbamoyl chloride was added 175 ml. pyridine and the resulting solution was left at room temperature. The solution was treated with 200 ml. ether and left at room temperature to complete the crystallization process. The crystals were filtered, washed with ether and recrystallized twice from methanol and ether to give 27.0 g. of product, M.P. 131–2°.

EXAMPLE VIII

O - [N - n-propyl-N-(4-methoxyphenyl)-carbamoyl]-3-diethylaminopropiophenone oxime hydrochloride To a mixture of 10.2 g. of 3-diethylaminopropiophenone oxime and 10.5 g. of n-propyl-4-methoxyphenylcarbamoyl chloride was added 50 ml. of pyridine and the resulting solution was left at room temperature. The solution was treated with 50 ml. ether and left at room temperature to complete the crystallization process. The crystals were filtered, washed with ether and recrystallized twice from methanol and ether to give 9.8 g. of product, M.P. 144–5°.

EXAMPLE IX

O - [N - ethyl-N-(4-dimethylaminophenyl)carbamoyl]-3-pyrrolidinopropiophenone oxime hydrochloride To a mixture of 9.6 g. of 3-pyrrolidinopropiophenone oxime and 10.1 g. of N-ethyl-N-(4-dimethylaminophenyl) carbamoyl chloride was added 150 ml. of pyridine and the resulting solution was left at room temperature. The solution was treated with 150 ml. ether and refrigerated to complete the crystallization process. The crystals were filtered, washed with ether and recrystallized twice from methanol and ether to give 6.5 g. of product, M.P. 187–90°.

EXAMPLE X

O-(4-dimethylaminophenylcarbamoyl)-4'-chloro-3-pyrrolidinopropiophenone oxime dihydrochloride A mixture of 7.8 g. of 4'-chloro-3-pyrrolidinopropiophenone oxime and 5.0 g. of 4-dimethylaminophenylisocyanate in 500 ml. benzene was stirred at room temperature. The solution was evaporated to give a residue which was dissolved in 200 ml. ether and treated with 15 ml. saturated ethanolic hydrogen chloride. The resulting solid was filtered, washed with ether and dried to give 9 g. of crude product. The solid was recrystallized twice from methanol and ether to give 7.0 g. of product, M.P. 168–171°.

EXAMPLE XI

O-[bis-(4-methoxyphenyl)carbamoyl]-3-diethylamino-propiophenone oxime hydrochloride To a mixture of 1.3 g. of 3-diethylaminopropiophenone oxime and 1.7 g. of bis(4-methoxyphenyl)-carbamoyl chloride was added 25 ml. of pyridine and the resulting solution was left at room temperature. After a solid began to crystallize, the reaction mixture was refrigerated to complete the crystallization process. The crystals were filtered, washed with pyridine and ether and recrystallized twice from methanol and ether to give 1.7 g. of product, M.P. 210–211°.

In accordance with the processes described in the examples the following compounds, in the form of either salts or free bases, were prepared:

| $R_1$ | $R_2$ | $R_3$ | Y | X |
|---|---|---|---|---|
| 4-MeO-Ph | H | 4-MeO-Ph | $(CH_2)_2$ | $N(C_2H_5)_2$. |
| 3-MeO-Ph | H | Same | Same | Same. |
| 3-HO-Ph | H | do | do | Do. |
| Ph | H | do | do | $N(CH_3)_2$. |
| | H | do | do | Morpholino. |
| | H | do | do | Homopiperidino. |
| | H | do | do | N-methylpiperazino. |
| | H | 3-MeO-Ph | do | $N(C_2H_5)_2$. |
| | H | 4-Me-Ph | do | Same. |
| | H | 4-EtO-Ph | do | Do. |
| | Et | Ph | do | Do. |
| | Et | Et | do | Do. |
| | H | Ph | do | $N(CH_3)_2$. |
| | H | 4-Cl-Ph | do | Same. |
| $\alpha$-$C_{10}H_7$ | H | Cyclohexyl | do | Do. |
| Ph | H | 4-MeO-Ph | $(CH_2)_3$ | Pyrrolidino. |
| | H | n-$C_4H_9$ | $(CH_2)_2$ | $N(CH_3)_2$. |
| | H | Cyclohexyl | Same | Same. |
| | H | 6-Cl-Ph | do | Do. |
| | H | $\alpha$-$C_{10}H_7$ | $(CH_2)_2$ | $N(CH_3)_2$. |
| | H | $\alpha$-$C_{10}H_7$ | Same | $N(C_2H_5)_2$. |
| | H | Cyclohexyl | do | Pyrrolidino. |
| 4-MeO-Ph | H | do | do | Do. |
| | H | do | do | Piperidino. |
| | H | do | do | Homopiperidino. |
| | H | 4-Cl-Ph | do | $N(C_2H_5)_2$. |
| | H | 2-MeO-Ph | do | Same. |
| Ph | H | $\alpha$-$C_{10}H_7$ | do | Do. |
| | H | Ph | $(CH_2)_3$ | Do. |
| | H | 2-Cl-Ph | $(CH_2)_2$ | $N(CH_3)_2$. |
| | H | 3-Cl-Ph | Same | Same. |
| | H | 4-F-Ph | do | Do. |
| | H | 4-Cl-Ph | do | Pyrrolidino. |
| 4-Cl-Ph | H | Ph | do | Do. |
| 6-Py | H | 4-MeO-Ph | do | $N(CH_3)_2$. |
| | H | Ph | do | Piperidino. |
| Ph | H | 4-Py | do | $N(CH_3)_2$. |
| | H | 6-Th | do | Same. |
| 6-Fu-$CH_2$ | Et | 4-MeO-Ph | do | Do. |
| 2-Th | H | Same | do | Pyrrolidino. |
| | Me | do | do | $N(C_2H_5)_2$. |
| | $PhCH_2$ | do | do | Same. |
| | $PhCH_2CH_2$ | do | do | Do. |
| | i-Pr | do | do | Do. |
| | Allyl | do | do | Do. |
| Ph | H | do | do | 2-Me-piperidino. |
| | H | 4-$(Me)_2$N-Ph | do | $N(C_2H_5)_2$. |
| | H | 4-MeS-Ph | do | Same. |
| | H | 4-MeO-Ph | do | 2-Me-pyrrolidino. |
| | H | 4-MeS-Ph | do | Pyrrolidino. |
| | H | 4-$(Me)_2$N-Ph | do | Do. |
| 4-Cl-Ph | Me | 4-MeO-Ph | do | Do. |
| | Pr | Same | do | Do. |
| | Allyl | do | do | Do. |

NOTE.—Ph=Phenyl; py=Pyridyl, Th= thienyl; Fu=Furyl.

The carbamoyl esters of the oximes of this invention have a high degree of analgesic activity, the highest activity being shown by those compounds where $R_1$ is phenyl and $R_3$ is a para substituted phenyl, particularly a lower alkoxyphenyl or a p-dialkylaminophenyl, such as p-methoxyphenyl, p-ethoxyphenyl, and p-dimethylaminophenyl.

A number of compounds wherein both $R_1$ and $R_3$ are phenyl exhibit potent anticonvulsant activity. Many of the compounds also exhibit hypotensive activity. In particular, the compound O-(4-methoxyphenylcarbamoyl)-3-pyrrolidinopropiophenone oxime shows good activity. Likewise, many compounds show topical anesthetic activity, the best effects being observed when $R_1$ is phenyl or 4-chlorophenyl and $R_3$ is cycloalkyl, such as cyclohexyl.

Using the hot plate method of Eddy and Leimbach, J. Pharmacol, Exptl. Therap. 107, 385 (1953), for determining analgesic activity, the following results were obtained when representative compounds of this invention were administered subcutaneously in mice:

| $R_1$ | $R_2$ | $R_3$ | X | E.D.$_{50}$ dose, mg./kg. |
|---|---|---|---|---|
| | H | 4-MeO-Ph (¹) | $N(CH_3)_2$ | 14 |
| | 4-MeO-Ph | Same | $N(C_2H_5)_2$ | 4 |
| | H | 4-Me-Ph | Same | 8 |
| Ph | H | 4-MeS-Ph | Pyrrolidino | 4 |
| | H | 4-Et-Ph | $N(C_2H_5)_2$ | 10 |
| | H | 4-$(Me_2)$N-Ph | Pyrrolidino | 3 |
| | H | 4-MeO-Ph | $N(C_2H_5)_2$ | 3 |
| 4-Cl-Ph | H | 4-$(Me_2)$N-Ph | Pyrrolidino | 4 |
| Ph | H | 4-EtO-Ph | $N(C_2H_5)_2$ | 6 |
| 4-Cl-Ph | Allyl | 4-MeO-Ph | Pyrrolidino | 3 |
| | H | Same | do | 4 |
| Ph | H | do | Piperidino | 4 |
| | H | do | Homopiperidino | 8 |
| Fu | H | do | $N(C_2H_5)_2$ | 9 |
| Ph | Et | do | Same | 2 |

¹ Y=$(CH_2)_2$.

The compounds of the present invention are administered orally, parenterally, rectally, or topically. Oral administration is in solid or liquid unit dosage forms such as tablets, capsules, powders, granules, syrups, elixirs, and the like, containing suitable quantities of the desired compound either as the salt or free base.

Powders are quite simply prepared by comminuting the active compound to a suitably fine size and mixing with a similarly comminuted diluent. The diluent can be an edible carbohydrate material such as starch. Advantageously, a sweetening agent or sugar is present as well as flavoring oil.

Granules for reconstitution into a liquid oral preparation are prepared utilizing water-soluble diluents. An active compound and a water soluble diluent such as sucrose, glucose, and the like, is wetted with a binder such as acacia mucilage, gelatin solution, methylcellulose solution and forced through a screen to form granules which are allowed to dry. Advantageously, a suspending agent such as tragacanth is included in the composition.

Capsules are made by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the desired compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets.

Advantageously the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of desired compound for administration.

A syrup is prepared by suspending the active compound in a suitably flavored aqueous sucrose solution. Similarly, an elixir is prepared utilizing a hydro-alcoholic vehicle.

For parenteral administration, aqueous and oleaginous fluid unit dosage forms can be prepared. In preparing the parenteral form, a measured amount of the active compound is placed in a vial, the vial and its contents sterilized and sealed. An accompanying vial of sterile water is provided as a vehicle to form a suspension prior to administration. Advantageously the sterile water can have dissolved therein a local anesthetic and buffering agent.

In addition to oral and parenteral administration, the rectal route can be utilized. The active compound can be administered by means of a suppository. A vehicle which has a melting point at about body temperature or one that is readily miscible can be utilized. For example, cocoa butter and various polyethylene glycols can serve as the vehicle. Advantageously, a buffer is included in the solid and liquid composition to aid in preventing the hydrolysis of the compound. Alkaline buffers such as calcium carbonate, sodium bicarbonate, and the like can be used in the manner known in the art to provide an alkaline environment.

Topical compositions may be conveniently prepared in the form of creams by mixing the desired active compound with polyethylene glycol 400 and propylene glycol using a filler such as titanium dioxides. Desirably, a disinfectant, such as butylated hydroxytoluene may be added.

In effecting analgesia in mammals a selected compound in a desired formulation is administered to the animal suffering from pain in an amount sufficient to induce a state of analgesia. In humans, individual daily dosages may range from about 5–15 mg. when the compound is administered parenterally and from about 30–60 mg. when administered orally. However, the individual unit dose and frequence of administration will be determined not only by the nature and severity of the subject's pain for which induction of a state of analgesia is desired, but in addition upon the age, weight and species of subject, its underlying physical condition and the route of administration. It will, accordingly, be within the professional judgment and skill of the practitioner administering the drug to determine the exact amount to be administered such as to be non-toxic, yet sufficient to induce a state of analgesia in the subject.

I claim:

1. A compound selected from the group of compounds having the structure

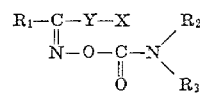

wherein $R_1$ is cycloalkyl having from 3–6 carbon atoms, phenyl, lower alkylphenyl, lower alkoxyphenyl, halophenyl, or naphthyl;

$R_2$ is hydrogen, lower alkyl, lower alkenyl, phenyl, or lower alkoxyphenyl;

$R_3$ is phenyl, lower alkylphenyl, lower alkoxyphenyl, halophenyl, lower alkylthiophenyl, di-(lower alkyl)-amino-phenyl, or naphthyl;

Y is an alkylene group having 2 or 3 carbon atoms; and

X is di-(lower alkyl)-amino;

and their pharmaceutically acceptable, non-toxic acid addition salts.

2. A compound according to claim 1, wherein $R_1$ is phenyl.

3. A compound according to claim 1, wherein $R_3$ is p-lower alkoxyphenyl.

4. A compound according to claim 3, wherein $R_3$ is p-methoxyphenyl or p-ethoxyphenyl.

5. A compound according to claim 3, wherein $R_2$ is hydrogen.

6. A compound according to claim 1, wherein $R_1$ is phenyl,
$R_2$ is hydrogen,
$R_3$ is p-ethoxyphenyl,
Y is ethylene, and
X is diethylamino.

7. A compound according to claim 1, wherein $R_1$ is phenyl,
$R_2$ is hydrogen,
$R_3$ is p-methoxyphenyl,
Y is ethylene, and
X is dimethylamino.

8. A compound according to claim 1, wherein $R_1$ is phenyl,
$R_2$ is hydrogen,
$R_3$ is p-methoxyphenyl,
Y is ethylene, and
X is diethylamino.

9. A compound according to claim 1, wherein $R_1$ is phenyl,
$R_2$ is hydrogen,
$R_3$ is p-tolyl,
Y is ethylene, and
X is diethylamino.

10. A compound according to claim 1, wherein $R_1$ is p-methoxyphenyl,
$R_2$ is hydrogen,
$R_3$ is p-methoxyphenyl,
Y is ethylene, and
X is diethylamino.

11. A compound according to claim 1, wherein $R_1$ is phenyl,
$R_2$ is ethyl,
$R_3$ is phenyl,
Y is ethylene, and
X is diethylamino.

12. A compound according to claim 1, wherein $R_1$ is phenyl,
$R_2$ is ethyl,
$R_3$ is p-methoxyphenyl,
Y is ethylene, and
X is diethylamino.

13. A compound according to claim 1, wherein $R_1$ is phenyl,
$R_2$ is propyl,
$R_3$ is p-methoxyphenyl,
Y is ethylene, and
X is diethylamino.

14. A compound according to claim 1, $R_1$ is phenyl,
$R_2$ is 4-methoxyphenyl,
$R_3$ is 4-methoxyphenyl,
Y is ethylene, and
X is diethylamino.

References Cited

UNITED STATES PATENTS 3,063,823  11/1962  Kuhle et al. _____ 260—566
3,256,330  6/1966  Kilsheimer et al. ____ 260—566

OTHER REFERENCES

Goldschmidt, H., Berichte (1889), vol. 22, p. 3101–03.

ALEX MAZEL, Primary Examiner

B. DENTZ, Assistant Examiner

U.S. Cl. X.R.

260—294, 239, 326.3, 347.3, 332.3, 247.2, 268, 290, 295.5, 295; 424—232, 233, 248, 250, 264, 267, 274, 285, 286